Figure 1:
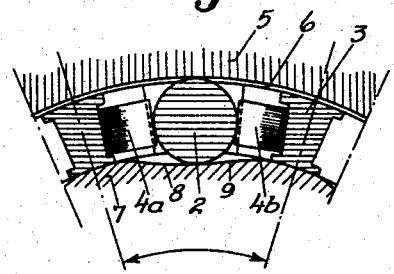

Oct. 10, 1933. F. LJUNGSTROM 1,929,503
FRICTION CLUTCH
Filed Dec. 31, 1929 3 Sheets-Sheet 1

INVENTOR
Fredrik Ljungstrom
BY
his ATTORNEY

INVENTOR
Fredrik Ljungström
BY
his ATTORNEY

Oct. 10, 1933.  F. LJUNGSTROM  1,929,503
FRICTION CLUTCH
Filed Dec. 31, 1929   3 Sheets-Sheet 3
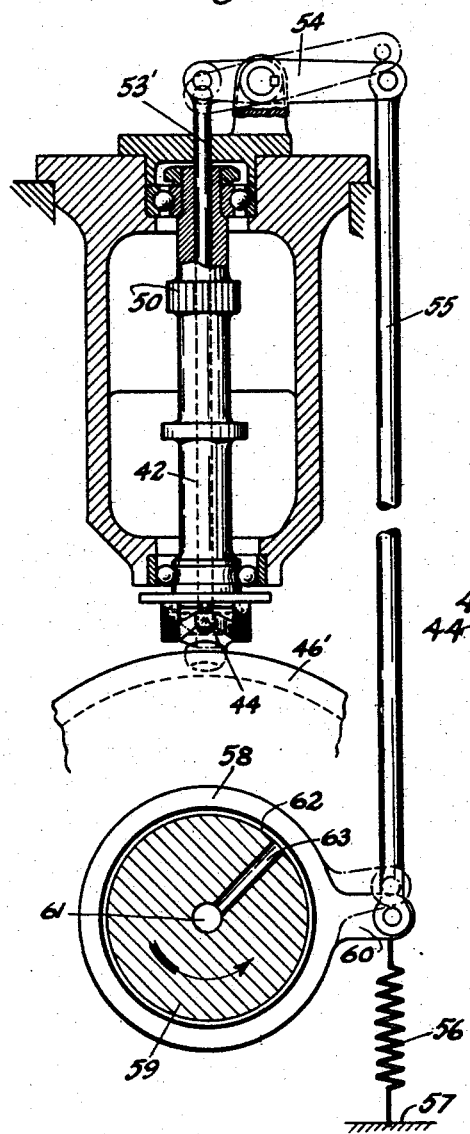
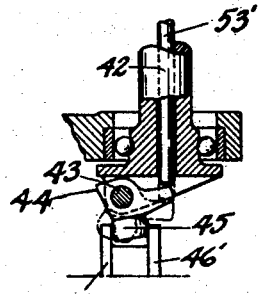
INVENTOR
Fredrik Ljungstrom
BY
his ATTORNEY Patented Oct. 10, 1933

1,929,503

UNITED STATES PATENT OFFICE 1,929,503

FRICTION CLUTCH

Fredrik Ljungstrom, Lidingo, Sweden, assignor, by mesne assignments, to Ped, Incorporated, a corporation of Delaware Application December 31, 1929, Serial No. 417,622, and in Sweden January 12, 1929

12 Claims. (Cl. 192—44)

This invention relates to friction clutches and has particular reference to that type of one-way friction clutch which grips to transmit force from a driving element to a driven element or to an abutment when the driving element tends to move in one sense or direction and which automatically releases to permit overrunning or freewheeling of the clutch parts when the driving element tends to move in the opposite sense or direction.

One of the forms of clutch of this type is that in which the force-transmitting members comprise roller detents inserted in wedge-shaped spaces formed between two converging surfaces, one of which is on the driving element and the other of which is on the driven or force-receiving element. Insofar as the scope of the present invention is concerned, however, other forms of clutch detents such as wedges or the like may be employed.

The essential characteristic of the type of clutch to which the invention relates is that in one direction of force-transmission the clutch elements are frictionally gripped by the wedging action of the clutch detents between the converging wedging surfaces of the elements, while with force transmission in the opposite direction the clutch elements are freed from each other by the release of the clutch detents from wedging relation with the clutch elements. During periods when the clutch parts are in engaging or gripping relation there is no relative motion between the gripping parts, but during periods of overrunning the clutch detents are in sliding contact with the gripping surfaces of the clutch elements. When the clutch is overrunning it is necessary to provide proper lubrication of the gripping surfaces and detents in order to prevent overheating and undue wear, and it is also highly desirable to prevent actual metal-to-metal contact between the clutch detents and the gripping surfaces during periods when the clutch is transmitting force from the driving element.

In friction clutches of the type referred to, the thickness of the oil film during overrunning periods and at the beginning of the gripping period is determined by the pressure applied to the roller detents tending to hold them in engagement with the gripping surfaces of the clutch elements. This pressure is ordinarily secured by applying engaging pressure to the roller detents through the medium of springs so mounted with respect to the detents as to tend to force them into contact with their cooperating wedging surfaces. In the forms of construction of this nature heretofore developed the engaging pressure applied to the detents has been substantially constant, and I have found that this is inadequate to effect the desired object under all conditions.

For example, the viscosity of the lubricant used will vary under varying temperature conditions. If the lubricant is cold and viscous, a relatively heavy engaging force on the detents will be required in order for the thickness of the oil film to be reduced sufficiently so that the detents will grip without slipping. On the other hand, if the lubricant is light and of low viscosity, a relatively light force will reduce the oil film to the required degree of thinness, and it will be readily understood that if the spring force necessary to secure proper operation with cold or viscous lubricant is employed at all times, this force will be too great under conditions when the lubricant is materially less viscous.

Furthermore, clutches of this character are used largely under conditions where they grip and release intermittently, the rapidity with which they grip and release varying with variations in the speed of operation of the apparatus of which they form a part. Such intermittent grip and release of the clutch detents is accompanied by oscillating motion of these parts, which motion subjects them to accelerating and decelerating forces of considerable magnitude. Under such conditions, the springs supplying the engaging force to the clutch detents must be strong enough to force the detents into engagement against the action of such forces, and it will be obvious that the springs must be strong enough to accomplish this purpose when these forces are of maximum magnitude. If the springs are sufficiently strong to accomplish their purpose when the forces of this nature produced are large, they will exert a force stronger than necessary under conditions producing relatively light accelerating and decelerating forces.

Again, if the clutch is operating at high speed so that the clutch detents alternately grip and release with great rapidity, the lubricant accumulating between them and the gripping surfaces during release periods must be squeezed out to the proper film thickness in an extremely small time interval. This requires the application of a relatively heavy engaging force, but it will also be seen that as the time intervals increase, as they do under lower speed conditions, the engaging force on the detents should be decreased if the proper thickness of lubricant film is to be maintained.

The principal object of my invention is to improve clutches of the type above referred to by varying the engaging force applied to the clutch detents in accordance with variations in operating conditions affecting the clutch.

Amongst the more specific objects of the invention are: To vary the engaging pressure applied to clutch detents so that an oil film is maintained between the clutch detents and their cooperating gripping surfaces at all times; to vary the engaging force applied to the clutch detents so that sufficient engaging force is supplied at all times to cause proper gripping engagement under all conditions; to vary the engaging force applied to the clutch detents so that at no time is an excess engaging force applied; to vary the engaging pressure applied to the detents in accordance with variations in the viscosity of the clutch lubricant; and to vary the engaging force in accordance with variations in the speed at which the clutch is operated.

The invention is particularly applicable to roller clutches of the type which I employ in automatic variable-speed transmissions in which turning moments of alternately opposite sense applied to one clutch element are segregated and transmitted to a driven shaft and to an abutment respectively by means of clutches which grip and release in opposed sense. Such transmissions are disclosed in United States Patent No. 1,810,283 granted June 16, 1931 on my application Serial No. 447,896 filed April 28, 1930, and the present invention is illustrated as applied to the mechanism shown in said patent. It is, however, to be understood that the disclosure herein is for illustrative purposes only and that the invention is equally well applicable to many other forms of apparatus.

Figure 2:
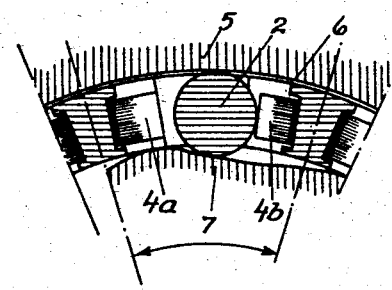
Figure 3:
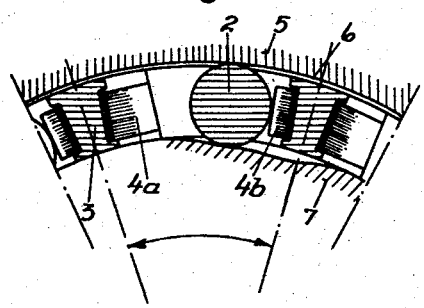
Figure 4:
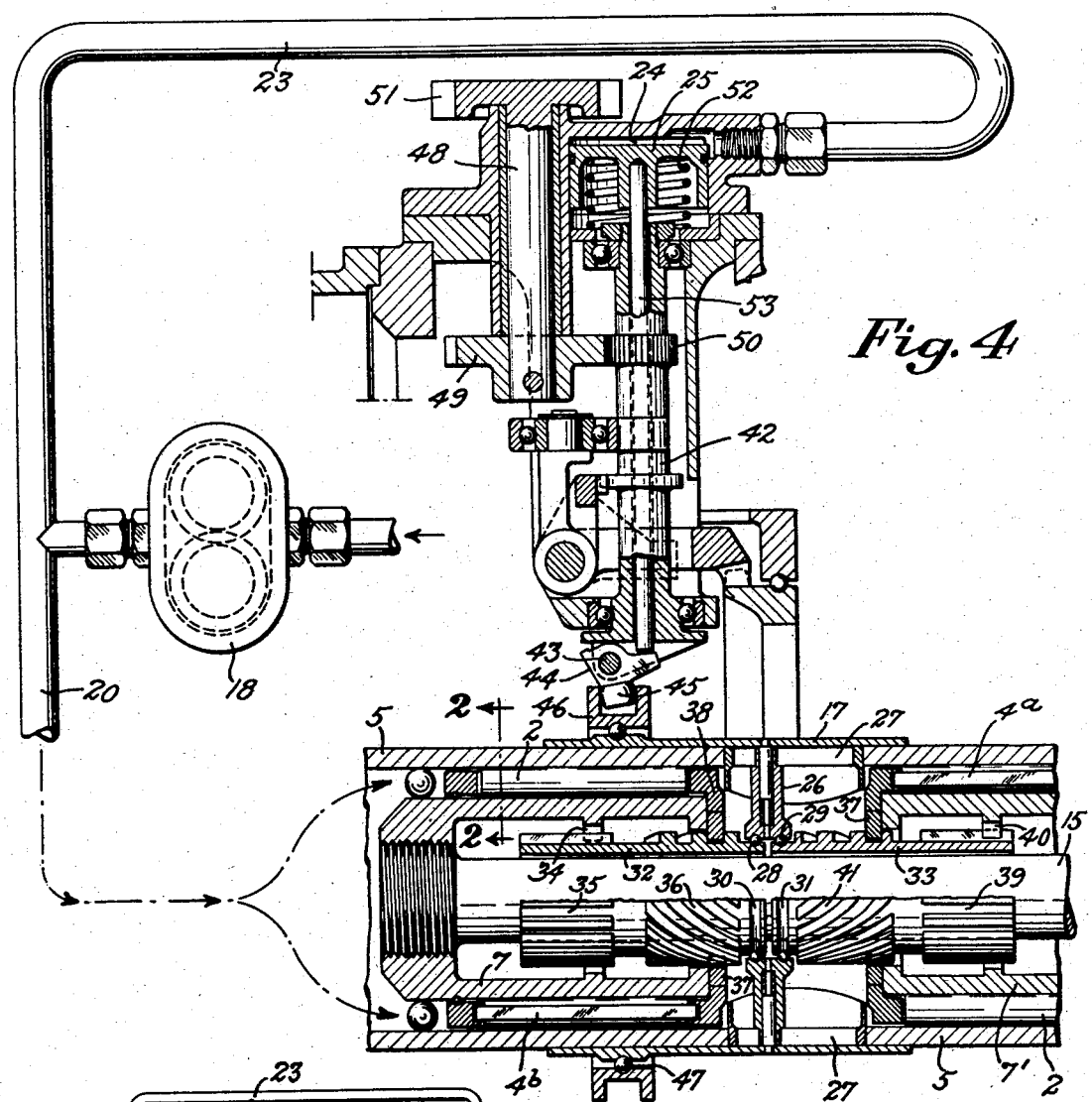
Figure 5:
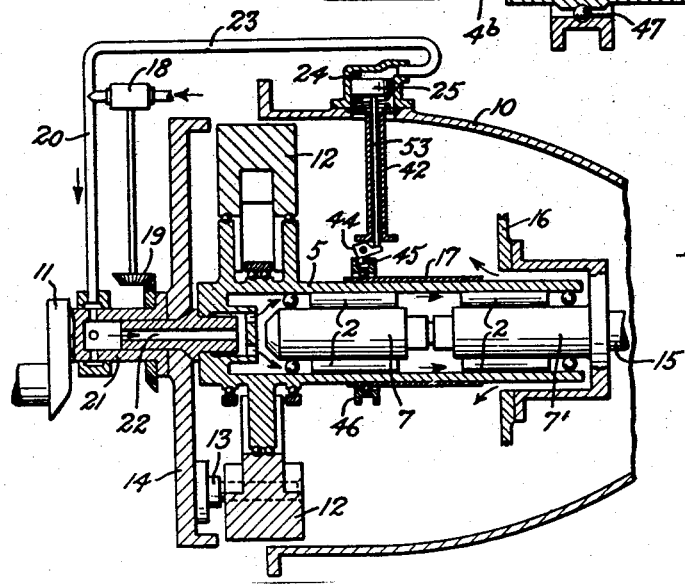

In the accompanying drawings, forming part of this specification, Fig. 1 is a fragmentary transverse section of part of a clutch embodying the invention; Fig. 2 is a section similar to Fig. 1 showing the clutch parts in different relative position, this section being taken on the line 2—2 of Fig. 4; Fig. 3 is a section similar to Fig. 1, but showing the clutch parts in still a different position of adjustment; Fig. 4 is a section illustrating one manner in which the invention may be applied to clutch mechanism embodied in a transmission of the type disclosed in my patent above referred to; Fig. 5 is a diagram illustrating the manner in which circulation of the lubricant is effected in the clutches of such a transmission; Fig. 6 is a fragmentary diagrammatic view illustrating another form of mechanism for carrying the invention into effect; and Fig. 7 is a section of a part of Fig. 6 taken at right angles to the plane of Fig. 6.

Referring now particularly to Figs. 1 to 3, I have shown a portion of a clutch mechanism such as is disclosed in my patent above referred to. The clutch comprises a plurality of cylindrical roller detents 2 arranged between the partitions or ribs 3 of a clutch roller cage and urged toward a central position between the ribs by means of leaf springs 4a and 4b mounted in the roller cage on either side of the rollers.

The rollers and cage are surrounded by a clutch element in the form of a sleeve 5 having a cylindrical inner surface 6 with which the rollers 2 are adapted to engage. A second clutch element is formed by the sleeve or shaft 7 the outer surface of which comprises a series of pockets formed by the oppositely inclined surfaces 8 and 9. Rollers 2 are disposed within the pockets formed between the surface 6 and the surfaces 8 and 9, and it will be seen from Fig. 1 that by turning the roller cage with respect to the inner sleeve 7, the roller detents 2 will be caused to engage either surface 6 and surfaces 8 or surface 6 and surfaces 9, depending upon the direction in which the roller cage is turned with respect to sleeve 7. If the roller cage is turned in counter-clockwise direction with respect to the sleeve 7 from the position shown in Fig. 1, the rollers 2 will be forced into engagement between the converging surfaces 6 and 8 by forces due to the compression of springs 4b. Assuming the sleeve 5 to be the driving element, it will be seen that this adjustment of the clutch detents will cause them to grip between the surfaces 6 and 8 when the sleeve 5 is turned in counter-clockwise direction and to release when the sleeve 5 is turned in clockwise direction.

If the roller cage is moved in clockwise direction with respect to the sleeve 7, the roller detents will be held in engagement between the surface 6 and the surfaces 9 by the action of springs 4a and in this position of adjustment it will be apparent that clockwise movement of the sleeve 5 will cause the detents to grip between the surfaces engaged and to release upon counter-clockwise movement of the sleeve 5.

From the above it will be seen that the clutch is reversible to provide drive from one to the other of the clutch elements in selected direction, reversal being accomplished by moving the roller cage with respect to one of the clutch elements. The present invention, however, will be described only in connection with drive in one direction, since the action of the clutch mechanism with respect to the factors involved in the invention is identical in both directions of drive.

Assuming therefore, that it is desired to transmit drive in counter-clockwise direction from sleeve 5 to sleeve 7; the roller cage is moved in counter-clockwise direction with respect to sleeve 7 from the position shown in Fig. 1. From a consideration of Figs. 2 and 3 it will be seen that the amount of engaging force applied to the roller detents 2 tending to hold them in contact with the wedging or gripping surfaces 6 and 8 will depend upon the amount of movement of the roller cage with respect to sleeve 7 and the amount of the consequent deformation of the springs 4b.

If the roller cage is moved to the position shown in Fig. 2, a relatively light engaging force will be applied to the detents 2 and under some operating conditions such light engaging force may be sufficient to cause gripping engagement of the detents as soon as the sleeve 5 tends to rotate in counter-clockwise direction with respect to sleeve 7. However, if the lubricant employed in the clutch is heavy and viscous, the relatively light engaging force may be insufficient to reduce the thickness of the oil film between the detents and the engaging surfaces sufficiently to prevent slippage. Under such conditions the engaging force applied to the rollers should be increased, and this increase in engaging force may be obtained by moving the roller cage to a position such as that shown in Fig. 3, so that the deformation of springs 4b is increased and the engaging force applied to the detents by the springs is increased.

While the position of the clutch parts shown in Fig. 3 will accomplish the desired result of securing engagement of the clutch detents with a viscous lubricant, it will be seen that the continued application of the relatively heavy engaging force when the lubricant is relatively light and of low viscosity will cause undue friction loss and wear during periods when the clutch is overrunning, that is, when sleeve 5 is moving in clockwise direction with respect to sleeve 7 and the detents 2 are rolling idly between the surfaces 6 and 8.

In order, therefore, to secure the necessary engaging force on the roller detents when the lubricant is relatively heavy and viscous, and to prevent the application of an excessive engaging force when the lubricant is relatively light and of low viscosity, I provide means whereby the relative position of the roller cage with respect to the sleeve 7, which determines the engaging force, is varied in accordance with variations in the viscosity of the lubricant used in the clutch.

As previously pointed out, other factors entering into the operation of the clutch, such, for example, as variations in the speed with which the roller detents are caused to alternately grip and release under different conditions of drive, require variation in the engaging force applied to the detents if the most effective operation thereof is to be secured. I therefore provide means for altering the position of the roller cage with respect to the sleeve 7 in response to variations in the speed at which the clutch is operated.

Referring now to Figs. 4 and 5, I have illustrated one form of mechanism embodying the invention in which two reversible roller clutches are employed in a variable speed transmission of the type disclosed in my patent previously referred to. Figs. 4 and 5 show a sufficient portion of the transmission structure to enable the nature of the present invention to be understood.

In the diagram shown in Fig. 5, the transmission comprises a casing 10 in which is rotatably mounted the clutch sleeve 5. Motion is transmitted to the clutch sleeve 5 from the drive shaft 11 of an internal combustion engine, or the like, through the medium of eccentrically mounted inertia weights 12 which are rotated through the medium of driving pins 13 secured to the fly wheel 14, the latter turning at drive shaft speed. Under some conditions of drive the weights 12 apply to the clutch sleeve 5 turning moments of alternate opposite sense tending to cause the sleeve to oscillate and under other conditions of drive the weights 12 apply to the sleeve 5 a continuous turning moment of one sense. When alternate opposite turning moments are applied to sleeve 5, they are segregated by means of the two clutches associated therewith, the left hand clutch in Fig. 5 operating to transmit turning moments of one sense through the clutch sleeve 7 to the driven shaft 15 of the transmission. The turning moments of the opposite sense are transmitted through the right hand clutch comprising sleeve 7' to the transmission casing 10 by way of the member 16 which is connected to the casing. The right and left hand clutches are set in opposed relation and operate as ratchet devices permitting the clutch sleeve 7 and the driven shaft 15 to rotate in only one direction. When a continuous moment in one direction is applied to the clutch sleeve 5, this turning moment is transmitted to the driven shaft by the left hand clutch and the right hand clutch overruns continuously.

Reversal of the clutches is effected by longitudinal movement of the shift sleeve 17 as will hereinafter be more fully described.

Lubricant is supplied to the clutches from a pump 18 which is preferably of the gear type and which is operated at a speed proportional to the speed of the drive shaft 11. For purposes of illustration, I have shown pump 18 driven through the bevel gears 19, one of which is secured to the shaft 11. Lubricant delivered by the pump 18 is conducted through the conduit 20, the rear bearing 21 of shaft 11 and the bore 22 to the annular space between sleeves 5 and 7. It flows axially between the sleeves to lubricate the left hand clutch and then flows axially between the right hand part of sleeve 5 and the sleeve 7' to lubricate the right hand clutch. After flowing through the clutches, the lubricant is thrown outwardly by centrifugal force to lubricate the remaining parts of the transmission.

A branch conduit 23 conducts lubricant to the piston chamber 24, in which is located piston 25, the latter being associated with the clutch mechanism in a manner which will be described later.

It will be evident that in the arrangement above described the pressure on piston 25 will vary with the discharge pressure from pump 18. This pressure, which exists in conduits 20 and 23, is responsive to the speed at which the pump operates, which speed is indicative of the speed of operation of the clutches. It is also responsive to variations in the viscosity of the lubricant supplied to the clutches since variations in the viscosity of the lubricant will be reflected in variations in the pressure required to force the lubricant through the channels leading from the pump to and through the clutches.

Turning now to Fig. 4 the manner in which the pressure variations in the supply conduit 20 and branch conduit 23 are employed to secure variation in the engaging pressure applied to the clutch rollers is illustrated.

The shift sleeve 17 is slidably mounted on the clutch sleeve 5 and has pinned thereto an annular spider 26, the arms of which extend through suitable slots in the clutch sleeve 5. These slots are lined with members 27 which extend radially inwardly of the sleeve 5 to prevent oil traveling axially inside the sleeve from being thrown out through the slots by centrifugal force.

The inner periphery of the spider 26 is grooved to form races for two groups of bearing balls 28 and 29 running between these races and races 30 and 31 cut in shift sleeves 32 and 33 respectively. It will be evident from the figure that the bearing balls 28 and 29 permit relative rotation between the spider 26 and shift sleeves 32 and 33 and also serve to effect axial movement of the shift sleeves upon axial movement of the spider.

Shift sleeves 32 and 33 are positioned around the driven shaft 15 which is connected at its forward end to the clutch sleeve 7.

The clutch sleeve 7 is provided with a row of inwardly projecting teeth 34 which slidably engage the external axial grooves 35 in the shift sleeve 32. A series of oblique external grooves 36 on the shift sleeve 32 is engaged by a series of inwardly projecting teeth 37 on the end ring 38 of the cage holding the rollers 2. The mounting of the rollers 2 and roller springs in this cage has already been described in connection with Figs. 1 to 3.

Shift sleeve 33 is similar to shift sleeve 32 providing axial slots 39 receiving the inwardly projecting teeth 40 on the clutch sleeve 7' and providing a series of oblique slots 41 engaged by the teeth 37 of the roller cage forming part of the right hand roller clutch.

As will be evident from the figure, the grooves 36 and 41 in the two shift sleeves are oppositely oblique and by reference to the drawings it will be evident that movement of the shift sleeve axially to the left as seen in the figure will cause the roller cage of the left hand clutch to be rotated in counter-clockwise direction (as viewed in Fig. 2) with respect to the clutch sleeve 7 and conversely, movement of the shift sleeve 17 to the right (as viewed in Fig. 4) will cause the roller cage to be shifted in clockwise direction, (as viewed in Fig. 2) with respect to sleeve 7. Similarly, axial shifting of sleeve 17 will cause turning movement of the cage of the right hand clutch with respect to the clutch sleeve 7', but due to the oppositely oblique positioning of the grooves 36 and 41, movement of sleeve 17 will cause the roller cages of the two clutches to be turned simultaneously in opposite directions with respect to their respective clutch sleeves 7 and 7'.

If the shift sleeve 17 is moved from one end of its axial travel to the other, both clutches will be simultaneously reversed and in the form of apparatus illustrated the movement of sleeve 17 necessary to effect reversal of the clutches is effected through the medium of the reversing shaft 42 rotatably mounted in the transmission casing. Shaft 42 is provided at its inner end with an eccentric pin 43 upon which is pivotally mounted the bell crank lever 44, one arm of which terminates in a ball end 45 engaging a groove in the ring 46 rotatably mounted on shift sleeve 17 through the medium of bearing balls 47. It will be evident that if shaft 42 is turned a half revolution, sleeve 17 will be shifted from one end of its path of axial travel to the other and upon a further turning movement of a half revolution of shaft 42, the shift sleeve 17 will be moved back to its original position. In order to turn shaft 42, a second shaft 48 is provided which carries a gear 49 meshing with gear 50 on the reversing shaft. The outer end of shaft 48 is provided with a ratchet wheel 51 adapted to be actuated by suitable reversing mechanism not shown. The specific means for effecting turning movement of the shaft 42 to effect reversal of the clutches is not pertinent to the present invention and therefore need not be described in detail.

If the bell crank 44 were fixed with respect to the reversing shaft 42, the end positions of the shift sleeve 17 would be fixed and consequently the amount of turning movement of the clutch cages with respect to the clutch sleeves would also be fixed. This would in turn establish a constant pressure on the clutch rollers due to the springs 4a or 4b depending upon which position the clutch cages were shifted to. In accordance with the present invention, the desired variation in the engaging pressure applied to the clutch rollers through the springs in the cages is varied by varying the extent of the axial travel of the shift sleeve 17. Considering the left hand clutch, it will be evident that if the sleeve 17 is shifted further to the left from the position shown in Fig. 4, (which position may be assumed to correspond to the position of the roller cage illustrated in Fig. 2) the roller cage will be shifted further in counter-clockwise direction with respect to the sleeve 7, to a position such for example as that shown in Fig. 3. This movement will result in an increase in the engaging pressure applied to the clutch rollers.

Such movement of the shift sleeve 17 when it is in the position shown in Fig. 4 is effected by an increase in the pressure in piston chamber 24 which moves piston 25 inwardly against the action of the retracting spring 52. Inward movement of piston 25 causes inward movement of the rod 53 slidably mounted in an axial bore passing through the reversing shaft 42. The inner end of rod 53 engages one arm of the bell crank lever 44 and as will be obvious from the drawings, inward movement of the rod 53 will cause the ball end of this lever to move to the left and shift the sleeve 17 accordingly.

If the reversing shaft 42 is turned a half revolution to reverse the clutches, the inward movement of the rod 53 due to an increase in pressure in chamber 24 will cause the ball end of the bell crank lever 45 to move to the right. In the reversed position of the clutch movement of the ball end of the lever and consequently of the shift sleeve 17 to the right will effect an increase in the engaging pressure on the clutch rollers in the same manner as movement of these parts to the left effects an increase in the engaging pressure on the rollers when the clutch is in the position of adjustment shown in Fig. 4.

The action of the device with respect to the clutch cage and rollers cooperating with the clutch sleeve 7' is like that which has been described and therefore need not be explained in further detail.

From the foregoing it will be evident that variation in the pressure of the lubricant within chamber 24 will operate to vary the engaging pressure applied to the clutch rollers through the springs in the roller cages and as previously explained. Variations in pressure in chamber 24 are a function of variations in the speed at which the clutches operate and also of the viscosity of the lubricant supplied thereto.

While for purposes of illustration I have described a clutch arrangement employing a plurality of clutches which are reversible, it will be evident that the invention is readily applicable to clutches of the character described, when such clutches are used in other mechanisms requiring only a single clutch which may or may not be of the reversible type.

Turning now to Figs. 6 and 7, I have illustrated in diagrammatic form a modified apparatus in which the variation in the engaging pressure on the clutch rollers is effected in a somewhat different manner under the influence of variations in the viscosity and pressure of the lubricant and of variations in the speed of operation of the clutch. In this form of the apparatus the general construction of the clutch or clutches and the means for turning the clutch cages with respect to the clutch sleeves may be the same as that shown in Fig. 4. In the present instance 46' represents the ring engaging the clutch shift sleeve and axial movement of this ring to vary the engaging pressure on the clutch rollers is effected in the manner already described, by axial movement of the rod 53'. Rod 53' is pivoted to one end of a lever 54, the other end of which is pivotally connected to an actuating rod 55, the latter being subjected to the influence of a retracting spring 56 secured to an abutment indicated at 57. Spring 56 tends to cause rod 53' to be moved outwardly so as to relieve the engaging pressure on the clutch rollers by permitting the ring 46' to move toward the right as seen in Fig. 7.

The actuating rod 55 is moved against the action of the retracting spring 56 by an annular member 58 surrounding and spaced from a shaft 59, and pivotally connected to the actuating rod by means of the arm 60. Shaft 59 may be any shaft rotating at a speed in proportion to the speed at which the clutch is operated. For example, it may be a part of a drive shaft such as shaft 11 in Fig. 5. The channel 61 in shaft 59 is in communication with the source of supply of lubricant for the clutches. Lubricant may be supplied to the clutches through this channel. The specific arrangement is not important, the essential feature being that the channel 61 bears the same relationship to the clutch lubricating system as the conduits 20 or 23 bear to the lubricating system shown in Fig. 5. Channel 61 is placed in communication with the annular space 62 between shaft 59 and the annular member 58 by means of channel 63 and through this latter channel lubricant is continuously supplied to the annular space 62. If the lubricant is viscous, it will be evident that the internal friction thereof will tend to cause the annular member 58 to rotate with the shaft and thus actuate the rod 55 in a manner to cause the engaging pressure on the clutch rollers to be increased. The amount of frictional drag tending to turn the annular member 58 will also increase with increase in speed of the shaft 59 so that the engaging pressure on the clutch rollers will be increased as the speed of the clutch increases. Furthermore, if the lubricant is supplied to the channel 61 by a positive displacement pump geared to the driving end of the clutch, an increase of the speed of operation of the clutch will cause an increase in the rate at which lubricant is supplied, which increase in rate will be reflected in a rise in the pressure of the lubricant in the annular space 62. This in turn will to some degree tend to increase the amount of drag on the member 58 thereby tending to cause the engaging pressure on the clutch rollers to be increased.

From the foregoing description it will be evident that the invention may include within its scope variations and changes in the specific method and apparatus employed for carrying the invention into effect and is to be understood as embracing all variations in method and apparatus that fall within the scope of the appended claims.

What I claim is:

1. In apparatus of the character described, the combination with a clutch having frictionally engaging detents and a member movable to increase the engaging force applied to said detents, of means for increasing the engaging force applied to said detents upon increase in the viscosity of the lubricant supplied to the clutch or of the speed of the clutch comprising a shaft rotating at a speed increasing in definite relation with increase in the clutch speed, a turnable sleeve surrounding said shaft and spaced therefrom, means for introducing clutch lubricant into the space between said shaft and said sleeve whereby a force tending to turn said sleeve is applied thereto due to the internal friction of the lubricant in said space, and means for transmitting turning movement of said sleeve to said member.

2. In the operation of a clutch comprising relatively movable members having lubricated cooperating friction surfaces engaging to transmit power through the clutch, that improvement which consists in applying an engaging force to one of said members and varying the value of said force in accordance with variations in the viscosity of the lubricant supplied to the clutch.

3. In the operation of a clutch comprising relatively movable members having lubricated cooperating friction surfaces engaging to transmit power through the clutch, that improvement which consists in supplying lubricant to said clutch and applying an engaging force to one of said members variable under the influence of variations in the viscosity of the lubricant and under the influence of variations in the speed of operation of the clutch.

4. In the operation of a clutch comprising relatively movable members having lubricated cooperating friction surfaces engaging to transmit power through the clutch, that improvement which consists in creating a flow of lubricant between relatively movable elements, whereby to transmit force from one to another of said elements due to internal friction of the lubricant therebetween and utilizing said force to apply engaging pressure to one of said members.

5. In apparatus of the character described, the combination with a clutch comprising relatively movable elements having lubricated cooperating friction surfaces engaging to transmit power through the clutch, of means for applying a variable engaging force to one of said members comprising spaced relatively movable elements one of which is adapted to move at a speed definitely related to the speed of operation of the clutch and the other of which is relatively stationary, means for introducing clutch lubricant into the space between said elements whereby a force is transmitted through said space to said relatively stationary element due to the internal friction of the lubricant, and means for transmitting to one of said clutch members the force transmitted to said relatively stationary element.

6. In apparatus of the character described, the combination with a clutch comprising relatively movable elements having lubricated cooperating friction surfaces engaging to transmit power through the clutch, of means for applying a variable engaging force to one of said members comprising relatively turnable elements spaced to provide an annular space therebetween, one of said elements turning at a speed definitely related to the speed of operation of the clutch, means for introducing clutch lubricant into said annular space to transmit force from one to the other of said relatively turnable elements due to internal friction of the lubricant in said space, and means for transmitting said force to one of said clutch members.

7. In the operation of a clutch comprising relatively movable members having lubricated cooperating friction surfaces engaging to transmit power through the clutch, that improvement which consists in applying mechanically an engaging force to one of said members to effect engagement of the clutch and modifying the value of the mechanically applied force in accordance with variations in the viscosity of the lubricant supplied to the clutch.

8. In the operation of a clutch comprising relatively movable members having lubricated cooperating friction surfaces engaging to transmit power through the clutch, that improvement which consists in applying mechanically a substantially constant engaging force to one of said members to effect engagement of the clutch and modifying the value of the mechanically applied force in accordance with variations in the viscosity of the lubricant applied to the clutch.

9. In the operation of a clutch comprising relatively movable members having lubricated cooperating friction surfaces engaging to transmit power through the clutch, that improvement which consists in applying mechanically an engaging force to one of said members to effect engagement of the clutch, creating a flow of clutch lubricant independently of the position of adjustment of said members and modifying the value of the mechanically applied force due to variations in the rate of said flow.

10. In the operation of a clutch comprising relatively movable members having lubricated cooperating friction surfaces engaging to transmit power through the clutch, that improvement which consists in applying mechanically an engaging force to one of said members to effect engagement of the clutch, creating a flow of clutch lubricant independently of the position of adjustment of said members, varying the rate of said flow in accordance with variations in the speed of operation of the clutch and increasing the value of said mechanically applied force due to increase in the rate of said flow.

11. In the operation of a clutch comprising relatively movable members having lubricated cooperating friction surfaces engaging to transmit power through the clutch, that improvement which consists in applying mechanically an engaging force to one of said members to effect engagement of the clutch, creating a flow of clutch lubricant flowing at a rate substantially proportional to the rate of operation of the clutch, creating a force due to pressure varying in accordance with variations in the rate of said flow and utilizing the last mentioned force to modify the engaging pressure applied by the first mentioned force.

12. In the operation of a clutch comprising relatively movable members having lubricated cooperating friction surfaces engaging to transmit power through the clutch, that improvement which consists in creating a flow of lubricant through the clutch at a rate substantially proportional to the speed of operation of the clutch and independent of the position of adjustment of said members, deriving a force due to said flow of lubricant and utilizing said force to modify the pressure with which said members are engaged.

FREDRIK LJUNGSTROM.